United States Patent [19]

Yamada et al.

[11] Patent Number: 4,670,969
[45] Date of Patent: Jun. 9, 1987

[54] METHOD OF MAKING SILICON DIAPHRAGM PRESSURE SENSOR

[75] Inventors: Kazuji Yamada; Yutaka Kobayashi, both of Hitachi; Kanji Kawakami, Mito; Satoshi Shimada, Hitachi; Masanori Tanabe, Hitachi; Shigeyuki Kobori, Hitachi, all of Japan

[73] Assignee: Hitachi, Ltd., Tokyo, Japan

[21] Appl. No.: 694,990

[22] Filed: Jan. 25, 1985

[30] Foreign Application Priority Data

Jan. 27, 1984 [JP] Japan .................................. 59-13672

[51] Int. Cl.⁴ .................... H01L 21/428; H01L 29/84
[52] U.S. Cl. ................................. 29/576 E; 29/25.35;
 29/576 T; 29/576 E; 29/576 C; 29/580;
 148/33.2; 148/DIG. 12; 148/DIG. 159;
 148/DIG. 168; 148/174; 357/26
[58] Field of Search .............. 29/25.35, 576 T, 576 E,
 29/576 C, 580; 148/33.2, DIG. 12, DIG. 159,
 DIG. 168, 174; 357/26; 338/2, 4

[56] References Cited

U.S. PATENT DOCUMENTS

| | | | |
|---|---|---|---|
| 3,819,431 | 6/1974 | Kurtz et al. | 357/26 |
| 3,893,228 | 7/1975 | George et al. | 357/26 |
| 3,941,629 | 3/1976 | Jaffe | 357/26 |
| 4,003,127 | 1/1977 | Jaffe et al. | 29/580 |
| 4,270,960 | 6/1981 | Ballen et al. | 29/576 E |
| 4,323,417 | 4/1982 | Lam | 29/576 E |
| 4,448,632 | 6/1984 | Akasaka | 29/576 T |
| 4,494,300 | 1/1985 | Schuattke et al. | 29/576 T |
| 4,510,671 | 4/1985 | Kurtz et al. | 148/DIG. 159 |
| 4,522,661 | 6/1985 | Morrison et al. | 29/576 E |
| 4,523,964 | 6/1985 | Wilner et al. | 29/580 |

FOREIGN PATENT DOCUMENTS 52-77686  6/1977  Japan .

OTHER PUBLICATIONS

Kabayashi et al., IEEE Electron Device Lett., vol. ED-L-4, No. 5, May 1983, pp. 132-134.
Ghandi, VLSI Fabrication Principles-Silicon and Gallium Arsenide, John Wiley & Sons, New York, pp. 421-424.

Primary Examiner—Brian E. Hearn
Assistant Examiner—John T. Callahan
Attorney, Agent, or Firm—Antonelli, Terry & Wands

[57] ABSTRACT

A method of making a silicon diaphragm pressure sensor includes forming an oxide film on one surface of a monocrystalline silicon substrate. A polycrystalline silicon layer is formed on the oxide film. The oxide film may be partly removed before the formation of the polycrystalline silicon layer. The polycrystalline silicon layer is heated and melt to recrystallize the same, thereby converting the polycrystalline silicon layer into a monocrystalline silicon layer. On the monocrystalline silicon layer may be epitaxially grown an additional monocrystalline silicon layer. By using the oxide film as an etching stopper, a predetermined portion of the substrate is etched over a range from the other surface of the substrate to the oxide film, thereby providing a diaphragm of the pressure sensor.

8 Claims, 20 Drawing Figures

FIG. I
PRIOR ART
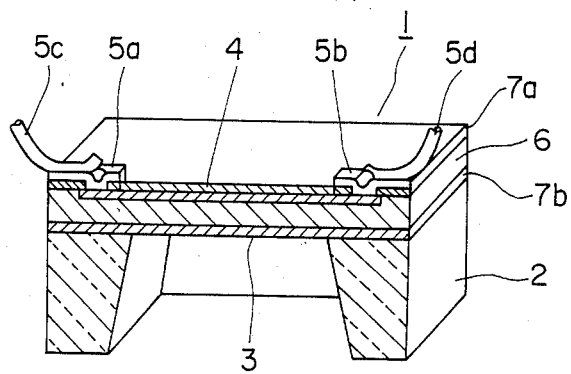
FIG. 2
PRIOR ART
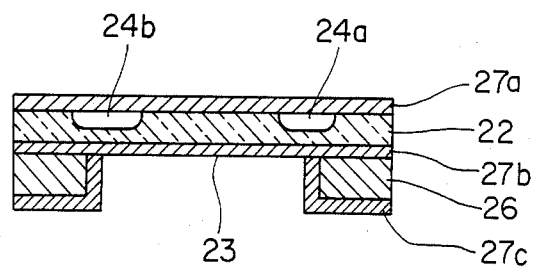

METHOD OF MAKING SILICON DIAPHRAGM PRESSURE SENSOR

The present invention relates to a method of making a silicon diaphragm pressure sensor.

In a silicon diaphragm pressure sensor, the thickness of a diaphragm greatly governs characteristics of the sensor. However, in a usually employed conventional method wherein a silicon wafer is directly etched so that the resulting portion of reduced thickness can be used as a diaphragm which is sensitive to a pressure applied thereto, it is difficult to control the diaphragm thickness with high accuracy since the diaphragm thickness itself as well as uniformity thereof is critically affected by the conditions of etching. Therefore, the technique for accurately working the diaphragm to a desired thickness plays an important role in making silicon diaphragm sensors. A technique for this purpose is disclosed in U.S. Pat. No. 4,003,127 issued on Jan. 18, 1977. An outline of this technique will be described with reference to FIG. 1. A silicon diaphragm pressure sensor chip generally designated by reference numeral 1 in FIG. 1 comprises a monocrystalline silicon substrate 2, a polycrystalline silicon layer 6, a diaphragm 3, a resistive layer 4 diffused in the polycrystalline silicon layer 6, pads 5a and 5b for supply of current to the resistive layer 4, wires 5c and 5d bonded to the pads, and oxide films 7a and 7b. A disphragm is generally designated by reference numeral 3.

In operation, when a pressure is applied to the diaphragm 3, this diaphragm is flexed and as a result, the resistance of the resistive layer 4 changes. A change in resistance is them derived through the wires 5c and 5d.

This type of silicon diaphragm pressure sensor is made through the following procedures:

(1) One surface of the monocrystalline silicon substrate 2 is oxidized to form the oxide film 7b;

(2) The polycrystalline silicon layer 6 is formed on the oxide film 7b through epitaxial growth process;

(3) The resistive layer 4 is formed in the layer 6 by diffusion;

(4) The pads 5a and 5b are formed in a manner well known in the art;

(5) The diaphragm 3 is formed through the use of etching process; and (6) The wires 5c and 5d are bonded to the pads.

This structure for a sensor uses the oxide film 7b as a stopper against etching for the formation of the diaphragm and is advantageous for accurate etching. However, because of the formation of the diffused resistive layer 4 in the polycrystalline silicon layer 6, the resulting piezoresistive effect is degraded as compared to that obtained from a diffused resistive layer formed in a monocrystalline silicon and in addition, the strength of the diaphragm is inferior to that of a diaphragm using a monocrystalline silicon, thus leading to fatal defects in the resulting sensor.

U.S. Pat. No. 3,819,431 issued on June 25, 1974 discloses another prior art silicon pressure sensor as shown in FIG. 2. This sensor operates in the same manner as the previous example and the sensor is fabricated as follows:

(1) The lower surface of a monocrystalline silicon substrate 22 is oxidized to form an oxide film 27b on which a polycrystalline silicon layer 26 is formed subsequently;

(2) Diffused resistive layers 24a and 24b are formed in the upper surface of the monocrystalline silicon layer 22; and (3) The polycrystalline silicon layer 26 is partly etched to form a diaphragm generally designated at 23. Also provided are oxide layers 27a and 27c.

In this sensor, the oxide film 27b, like the oxide film 7b shown in FIG. 1, serves as an etching stopper for the formation of the diaphragm to ensure highly accurate etching. However, in an application to ordinary pressure sensors, the thickness of the diaphragm comprised of the monocrystalline silicon substrate 22 is required to be very small, measuring about 25 $\mu$m. A wafer of 25 $\mu$m thickness for such a very thin monocrystalline silicon substrate 22 is difficult to fabricate and even if the thin wafer is obtained, its mechanical strength will be so small that the wafer will possibly be cracked in the course of the epitaxial growth of the polycrystalline silicon layer 26 on the wafer. If a wafer of a large thickness is employed, then a troublesome process will be needed for polishing the same wafer. In some applications where the thickness of the polycrystalline silicon layer 26 is required to be large, the thick polycrystalline silicon layer 26 adversely tends to crack and besides to cause the wafer 22 to warp, thus degrading accuracies in photolithography in the subsequent step.

Still another method using an etching stopper for the formation of a diaphragm of a silicon diaphragm pressure sensor is disclosed in Japanese Patent Application Laid-Open No. 52-77686 laid open on June 30, 1977. The diaphragm sensor obtained according to this method has a structure as shown in FIG. 3. The making method for this structure comprises the steps of: implanting nitrogen ions, oxygen ions or carbon ions in one surface 33a of a monocrystalline silicon substrate 32 to form an ion-implanted layer 34a which is resistant to an etchant for the semiconductor substrate 32 while forming a similar ion-implanted layer 34b in the peripheral portion of the other surface 33b of the substrate 32; forming a silicon epitaxial-growth layer 35 on the ion-implanted layer 34a; forming a diffused resistive layer 36 of a conductivity type opposite to that of the epitaxial growth layer 35 in the surface of the epitaxial growth layer 35; and etching a central portion of the substrate 32 over a range from the other surface 33b to the ion-implanted layer 34a by using the ion-implanted layer 34a as an etching stopper, to thereby form a diaphragm 37. It is disclosed in this laid-open Japanese Patent Application that after the ion-implantation the structure is heated at 1200° C. for 2 to 3 hours and as a result the ion-implanted layer 34a is formed uniformly beneath the surface 33a of the substrate 32 and the surface portion of the substrate 32 is brought into a monocrystalline state or monocrystallized. Further, it is also disclosed that the epitaxial growth layer 35 is created in the form of a monocrystalline silicon. In effect, however, according to the present inventors' experiments, it was difficult to epitaxially grow the layer 35 of FIG. 3 in the form of an excellent monocrystalline silicon layer and hence a great piezoresistive effect could not be obtained. Such difficulties seem to occur by reason that the surface portion of substrate 32 can not be brought into an excellent monocrystalline state and therefore, the epitaxial growth on the ion-implanted layer 34a can not lead to the formation of an excellent monocrystalline growth layer. In addition, since irregularities in ion concentration distribution may exist, it is difficult to render uniform the depth d, measured from the surface 33a of substrate 32, of the ion-implanted layer 34a serving as the etching stopper when etching the substrate 32. Consequently, etching depths as a result of etching of the substrate 32 from the other surface 33b thereof become non-uniform and hence the thickness of the diaphragm including the layer 34a do not also become uniform. The heat treatment necessary for bringing the ion-implanted layer 34a into the monocrystalline state aggravates the irregularities in the ion concentration distribution.

An object of the present invention is to provide a novel method of making a silicon diaphragm sensor which can afford to provide a sensor which has excellent characteristics and can be fabricated with high accuracies.

According to the present invention, there is provided a method of making a silicon diaphragm pressure sensor comprising: a first step of preparing a monocrystalline silicon substrate having first and second major surfaces and forming an oxide film of a predetermined thickness on the first major surface; a second step of forming a polycrystalline silicon layer on said oxide film; a third step of converting said polycrystalline silicon layer into a monocrystalline silicon layer by heating and melting said polycrystalline silicon layer to recrystallize the same; and a fourth step of etching a predetermined portion of said substrate over a range from the second major surface of said substrate by means of said oxide film as an etching stopper, thereby providing a diaphragm of the pressure sensor.

The polycrystalline silicon layer formed on the oxide film may have a relatively small thickness, and after the recrystallization conversion of the polycrystalline silicon layer into the monocrystalline silicon layer, an additional monocrystalline silicon layer may be deposited, as necessary, on the converted monocrystalline silicon layer through epitaxial growth process.

Prior to the formation of the polycrystalline silicon layer on the oxide film, the oxide film may be removed partly to expose a portion(s) of the monocrystalline silicon layer, in order that the monocrystallization process of the polycrystalline silicon layer can be facilitated.

According to one aspect of the invention, an impurity diffused region having an opposite conductivity type to that of the monocrystalline silicon layer is formed in the monocrystalline silicon layer. The diffused region serves as a piezo-resistor of the pressure sensor.

According to another aspect of the invention, the monocrystalline silicon layer obtained by the recrystallization is selectively removed to leave behind a predetermined pattern portion. The remaining monocrystalline silicon pattern serves as a piezo-resistor of the pressure sensor.

The present invention will now be described in detail with reference to the accompanying drawings, in which:

FIG. 1 is a perspective view, partly sectioned, showing a structure of a silicon diaphragm pressure sensor manufactured according to a prior art method;

FIG. 2 is a sectional view showing a structure of a silicon diaphragm pressure sensor manufactured according to another prior art method;

Figure 3:
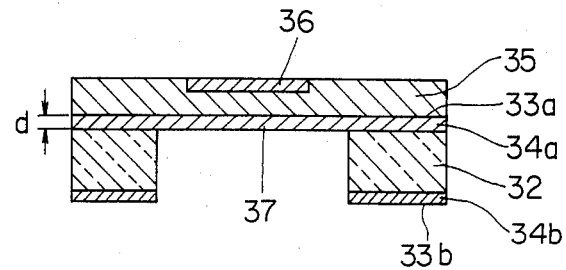
FIG. 3 is a sectional view showing a structure of a silicon diaphragm pressure sensor manufactured according to still another prior art method.
Figure 4:
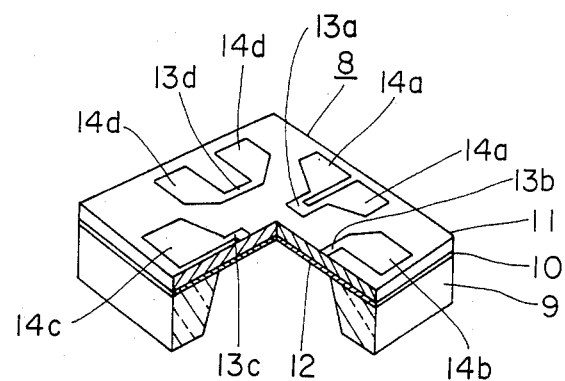
FIG. 4 is a perspective view, partly sectioned, showing a typical structure of a silicon diaphragm pressure sensor obtained according to a making method of the present invention.

Reference is now made to FIG. 4 which illustrates a typical structure of a silicon diaphragm pressure sensor manufactured according to a making method of the present invention. A pressure sensor chip 8 shown in FIG. 4 has the same function as the chip 1 shown in FIG. 1. A p or n-type monocrystalline silicon substrate 9 has a resistivity of 1 $\Omega$cm or more. Formed on the substrate is an oxide film 10 on which an n-type monocrystalline silicon layer 11 having in general a resistivity of 0.5 $\Omega$cm or more is formed by recrystallizing a polycrystalline silicon layer which is formed on the oxide layer 10. A diaphragm, generally designated at 12, is provided by etching a portion of the substrate 9 while using the oxide film 10 as an etching stopper. Diffused piezoresistive layers 13a to 13d are formed in the recrystallized layer 11 and connected with electrodes 14a to 14d.

This structure attains the following advantages:

(1) Since the oxide film 10 provides an efficient stopper against an alkaline etchant for the semiconductor substrate, a desired accurate thickness of the diaphragm can be obtained without accurately controlling the period of time for etching;

(2) The bottom surface of the diaphragm conformable to the surface of the oxide film can be of a flat mirror plane. On the other hand, in the case of a diaphragm defined by directly etching a wafer, the state of the etched bottom surface of the diaphragm greatly depends on the conditions of etching;

(3) Since the bottom surface of the diaphragm is covered by the oxide film, the sensor is highly resistant against ambient conditions; and (4) The thickness of the diaphragm determined by the thickness of the recrystallized layer is in general about 25 $\mu$m and the irregularity in the thickness of the diaphragm will be $\pm 1.3$ $\mu$m if the irregularity in the thickness of the recrystallized layer included in the wafer measures $\pm 5\%$. On the other hand, in the case of a diaphragm formed by directly etching a wafer having a parallelism of 7 $\mu$m, the irregularity in the thickness of the diaphragm will amount to $\pm 3.5$ $\mu$m. Obviously, the $\pm 1.3$ $\mu$m irregularity greatly improves the $\pm 3.5$ $\mu$m irregularity.

Usually, a passivating oxide film (not shown) may also be formed on the upper surface of the recrystallized layer. In that case, a variation of the sensor output due to a possible temperature change can be prevented since the upper and lower oxide films balance stress caused in the recrystallized layer due to the temperature change.

The silicon diaphragm pressure sensor is fabricated in accordance with an embodiment of manufacture method as will be described with reference to FIGS. 5a to 5e. In these Figures, members corresponding to those in FIG. 4 are denoted by the same reference numerals.

Figure 5A:
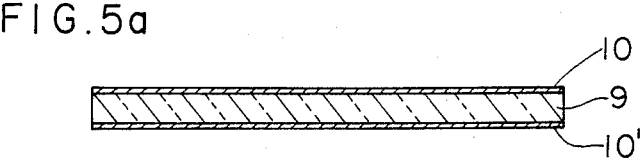
FIGS. 5a to 5e are sectional views showing fabrication steps according to an embodiment of the invention.

An n-type monocrystalline silicon substrate 9 having, for example, a resistivity of 1 to 5 Ωcm and a thickness of about 220 μm is first prepared and heated, at its upper and lower surfaces, to form oxide ($SiO_2$) films 10 and 10' of about 1 μm thickness on both the surfaces (see FIG. 5a).

Figure 5B:
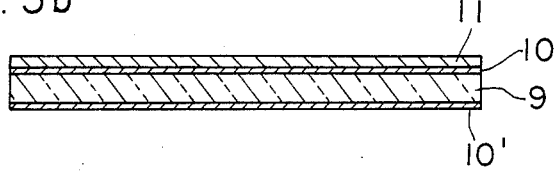

Next, as shown in FIG. 5b, an n-type polycrystalline silicon layer 11 of about 25 μm thickness is deposited on the oxide film 10 through a well known process, for example, a CVD process using $SiH_4$.

Figure 5C:
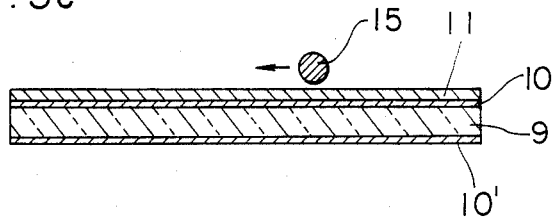

Thereafter, as shown in FIG. 5c, a zone melting device 15 for locally melting the polycrystalline silicon layer 11 is moved from righthand end to lefthand end of the wafer so as to convert the polycrystalline layer 11 into a monocrystalline layer. A portion of the polycrystalline silicon layer directly beneath the device 15 can be heated to above its melting point 1412° C. Details of the device 15 are described in, for example, Y. Kobayashi et al "Zone Melting Recrystallization of Polycrystalline Silicon Films on Fused Silica Substrates Using RF Heated Carbon Susceptor" IEEE Electron Device Lett., Vol. EDL-4, No. 5, pp 132-134 (1983). Instead of the device 15, the wafer may be moved.

Figure 5D:
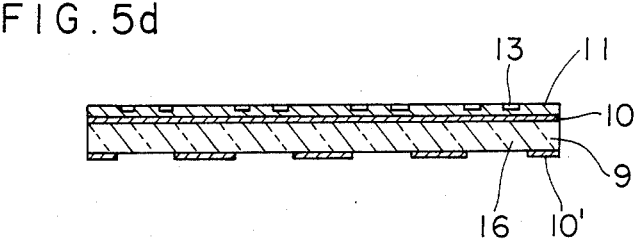
Figure 5E:
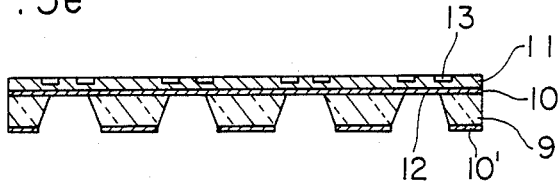

Subsequently, as shown in FIG. 5d, a p-type impurity, for example, boron is diffused into the monocrystalline layer 11 to form piezoresistive layers 13. On the surface in which the piezoresistive layers 13 are formed, a passivating oxide film and desired electrodes (not shown) are formed. Then, portions of the oxide film 10' in register with portions 16 of the substrate 9 corresponding to diaphragm areas are removed by means of common photolithographic process. Thereafter, as shown in FIG. 5e, the substrate 9 is partly etched by using, for example, an alkaline echant mainly containing KOH to form diaphragms 12. In this case, the oxide film 10 acts as the etching stopper so that the bottom surface of the diaphragm can be determined irrespective of the period of time for etching.

Thereafter, the wafer is diced as shown in FIG. 4 to obtain a number of pressure sensor chips 8. Obviously, in the above embodiment, the conductivity types n and p may be reversed.

Figure 6A:
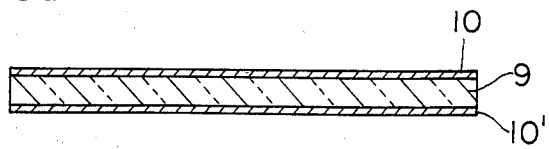
FIGS. 6a to 6f are sectional views showing fabrication steps according to another embodiment of the invention.
Figure 6B:
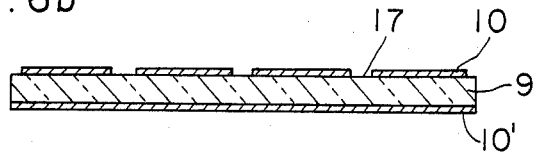

The recrystallization can be applied to obtain the monocrystalline layer 11 more efficiently in accordance with fabrication procedures shown in FIGS. 6a to 6f. In these figures, members corresponding to those of FIGS. 5a to 5e are designated by the same reference numerals. A similar structure to that of FIG. 5a is prepared as shown in FIG. 6a, and an oxide film 10 is then partly etched off to form regions 17 at which the surface of a substrate 9 is exposed. It is not always necessary to provide the regions 17 uniformly over the entire surface of the wafer, but the region may be provided only at, for example, the peripheral portion (righthand end in the illustration). In the embodiment shown in FIGS. 6a to 6f, the regions correspond to dicing marginal portions.

Figure 6C:
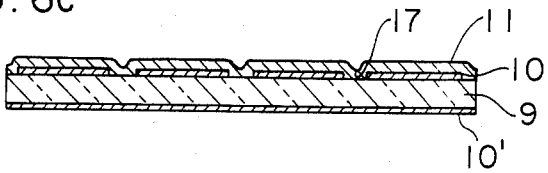
Figure 6D:
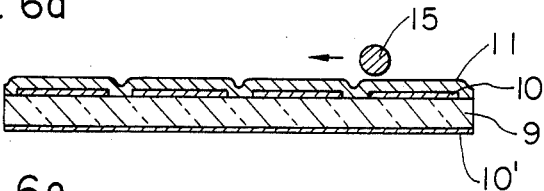
Figure 6E:
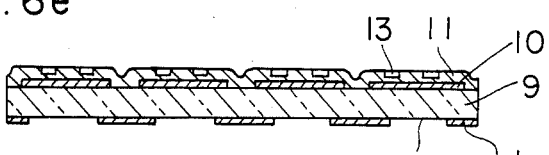
Figure 6F:
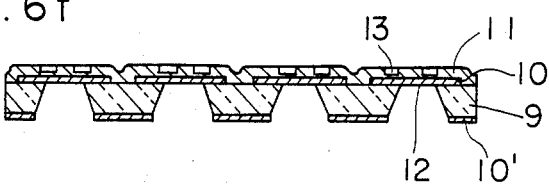

Subsequently, a polycrystalline silicon layer 11 is deposited which connects to the substrate 9 through the regions 17 (see FIG. 6c). Under the movement of the device 15 for locally melting the polycrystalline silicon layer 11 from righthand end to lefthand end as shown in FIG. 6d, the monocrystallization of the polycrystalline layer 11 tends to be facilitated in a direction of crystallization of the substrate 9 because the regions 17 act as nuclei for monocrystallization. Thereafter, the same fabrication steps as those in FIGS. 5d and 5e are carried out. In comparison with the embodiment of FIGS. 5a to 5e, the present embodiment can afford to provide the monocrystalline silicon layer 11 of high quality at the cost of one additonal fabrication step. Further, the monocrystalline silicon layer 11 and the substrate 9 can be maintained at the same potential to advantageously provide stability against electrical noises.

Modifications of the embodiments shown in FIGS. 5 and 6 will be described with reference to FIGS. 7 and 8.

Figure 7:
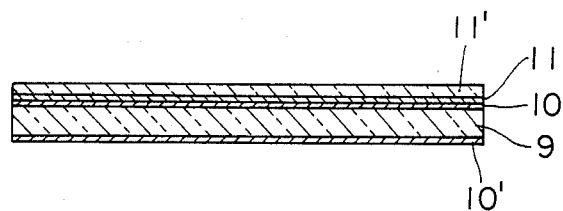
FIG. 7 is a sectional view for explaining a modification of the embodiment shown in FIGS. 5a to 5e.

In the modification shown in FIG. 7, an ordinary epitaxial-growth monocrystalline layer 11' is additionally deposited on the monocrystalline layer 11 obtained in the step of FIG. 5c. According to this modification, the monocrystallization of the polycrystalline silicon layer 11 which may have a relatively small thickness (0.5 to 1 μm) suffices and the monocrystallization procedure can be facilitated. In another modification of FIG. 8 similar to FIG. 7, teachings of the embodiment of FIGS. 6a to 6f are applied to provide regions 17 which connect the polycrystalline silicon layer 11 to the substrate 9. In the modifications of FIGS. 7 and 8, an impurity is diffused from the surface of the additional monocrystalline layer 11' to form piezoresistive layers (not shown) therein.

Figure 8:
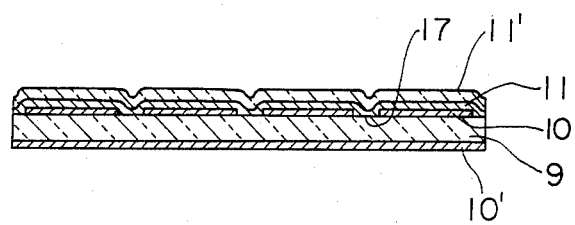
FIG. 8 is a sectional view for explaining a modification of the embodiment shown in FIGS. 6a to 6f.
Figure 9:
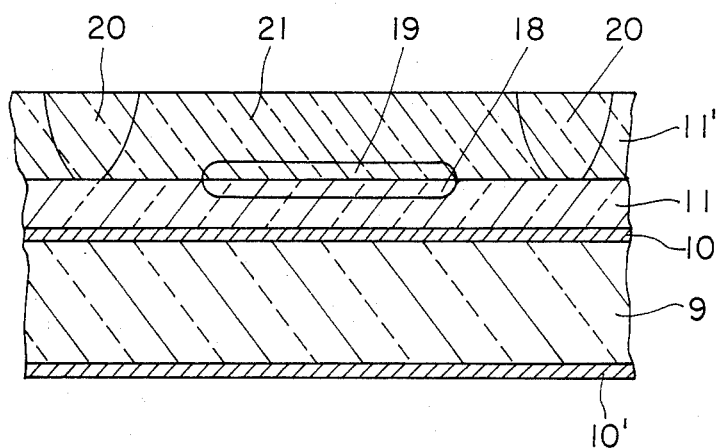
FIG. 9 is a sectional view useful in explaining that the modifications of FIGS. 7 and 8 are suitable for fabrication of an integrated circuit structure.

As will be best seen from FIG. 9, the modifications of FIGS. 7 and 8 permit the formation of the epitaxial growth layer 11' after the formation of an embedded layer in the recrystallized layer 11 and hence provide a structure suitable for integrated circuits. More particularly, as shown in FIG. 9, the p-type polycrystalline silicon layer 11 is monocrystallized and then an n-type embedded layer 18 is formed in the layer 11 by diffusion. Thereafter, the n-type epitaxial growth layer 11' is formed. In this case, the embedded layer 18 spreads into the epitaxial growth layer 11 under the influence of thermal diffusion to form a buried layer 19. Subsequently, p-type isolation regions 20 are formed to provide island regions 21 necessary for the formation of the integrated circuits. In making silicon diaphragm pressure sensors, it is desirable that signal processing circuits and temperature compensation circuits be formed on the peripheral portion of the same sensor chip. Such circuit elements can be formed in the island regions 21 shown in FIG. 9.

Figure 10A:
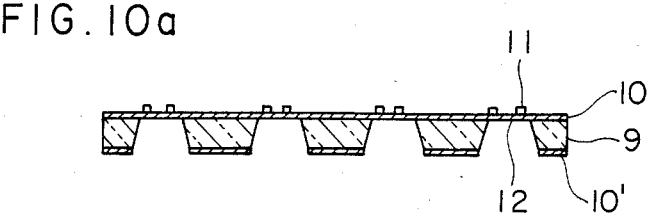
FIGS. 10a and 10b show, in sectional and perspective forms, a silicon diaphragm pressure sensor which is manufactured according to a further embodiment of the invention.
Figure 10B:
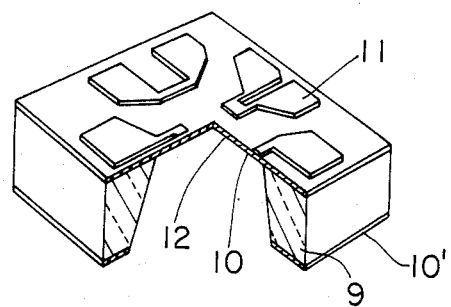

FIGS. 10a and 10b show a silicon diaphragm pressure sensor manufactured according to a further embodiment of the invention. This embodiment provides an ultra-thin diaphragm structure wherein a substantial constituent of a diaphragm is an oxide film. In FIGS. 10a and 10b illustrating, in sectional and perspective forms, the pressure sensor of this embodiment, members corresponding to those of FIGS. 4 and 5 are designated by the same reference numerals.

After completion of the fabrication step of FIG. 5c, the monocrystalline silicon layer 11 is partly removed to leave behind only desired pattern portions thereof and the substrate 9 is partly etched as shown in FIG. 5e, thereby providing the structure shown in FIGS. 10a and 10b. The remaining monocrystalline silicon patterns 11 serves as piezoresistive elements. The thickness of the monocrystalline layer 11 is preferably minimized to ensure that the influence of stress upon the oxide film diaphragm can be minimized and the diaphragm can fulfil itself efficiently. Since in this structure the thickness of the diaphragm is substantially equal to that of the oxide film, the formation of a diaphragm having a thickness of the order of 1 μm is feasible, the thereby making it possible to measure an extremely small pressure. In addition, in the FIG. 10 structure removed of pn-junctions, leakage current can be minimized and operation at high temperatures, for example, at 300° C. can be ensured.

Although, in the foregoing description, the recrystallization device for converting the polycrystalline silicon layer formed on the oxide film into the monocrystalline silicon layer is based on the zone melting process using an RF-heated carbon susceptor for illustration purpose only, the polycrystalline silicon layer may be melted by using laser beams, electron beams or thermal radiation from a heated strip carbon heater.

As has been described, according to the present invention, silicon diaphragm pressure sensors of excellent characteristics which can be fabricated with high accuracies can be obtained.

We claim:

1. A method of making a silicon diaphragm pressure sensor comprising:
    a first step of preparing a monocrystalline silicon substrate having first and second major surfaces and forming an oxide film of a predetermined thickness on the first major surface;
    a second step of forming a polycrystalline silicon layer on said oxide film;
    a third step of converting said polycrystalline silicon layer into a monocrystalline silicon layer by heating and melting said polycrystalline silicon layer to recrystallize the same;
    a fourth step of epitaxially growing an additional monocrystalline silicon layer on said monocrystalline silicon layer; and
    a fifth step of etching a predetermined portion of said substrate extending over a range from the second major surface of said substrate to the first major surface thereof while using said oxide film as an etching stopper, thereby providing a diaphragm of the pressure sensor.

2. A method according to claim 1 further comprising a step of selectively diffusing an impurity of an opposite conductivity type to that of said additional monocrystalline silicon layer from the surface of said additional monocrystalline silicon layer to form therein a diffused region of a predetermined pattern which serves as a piezo-resistor of the pressure sensor.

3. A method according to claim 1, wherein said additional monocrystalline silicon layer is epitaxially grown on said monocrystalline silicon layer after an impurity of an opposite conductivity type to that of said monocrystalline silicon layer is selectively diffused from the surface of said monocrystalline silicon layer to form therein a diffused layer which is to serve as a buried layer.

4. A method of making a silicon diaphragm pressure sensor comprising:
    a first step of preparing a monocrystalline silicon substrate having first and second major surfaces and forming an oxide film of a predetermined thickness on the first major surface;
    a second step of partly removing said oxide film to partially expose the first major surface of said substrate;
    a third step of forming a polycrystalline silicon layer on said oxide film;
    a fourth step of converting said polycrystalline silicon layer into a monocrystalline silicon layer by heating and melting said polycrystalline silicon layer to recrystallize the same:
    a fifth step of epitaxially growing an additional monocrystalline silicon layer on said monocrystalline silicon layer; and
    a sixth step of etching a predetermined portion of said substrate extending over a range from the second major surface of said substrate to the first major surface thereof while using said oxide film as an etching stopper, thereby providing a diaphragm of the pressure sensor.

5. A method according to claim 2, further comprising a step of forming a passivating oxide film on that surface of said additional monocrystalline silicon layer in which said diffused region as the piezo-resistor is formed.

6. A method according to claim 4, further comprising a step of selectively diffusing an impurity of an opposite conductivity type to that of said additional monocrystalline silicon layer from the surface of said additional monocrystalline silicon layer to form therein a diffused region of a predetermined pattern which serves as a piezo-resistor of the pressure sensor.

7. A method according to claim 6, further comprising a step of forming a passivating oxide film on that surface of said additional monocrystalline silicon layer in which said diffused region as the piezo-resistor is formed.

8. A method of making a silicon diaphragm pressure sensor comprising:
    a first step of forming an etch-resistant oxide film on one surface of a monocrystalline silicon substrate;
    a second step of forming a polycrystalline silicon layer on said etch-resistant oxide film;
    a third step of recrystallizing said polycrystalline silicon layer into a monocrystalline silicon layer;
    a fourth step of epitaxially growing an additional monocrystalline silicon layer of one conductivity type on said monocrystalline silicon layer;
    a fifth step of selectively diffusing an impurity of an opposite conductivity type to said one conductivity type into said additional monocrystalline silicon layer to form therein a piezo-resistor of the pressure sensor;
    a sixth steo of forming a passivating oxide film on said additional monocrystalline silicon layer; and
    a seventh step of selectively etching a predetermined central portion of said monocrystalline silicon substrate from a surface thereof opposite to said one surface until said one surface is reached to define a diaphragm of the pressure sensor which includes said etch-resistant oxide film, said monocrystalline silicon layer, said additional monocrystalline silicon layer and said passivating oxide film and which is peripherally supported by the remaining portion of said monocrystalline silicon substrate.

* * * * *